United States Patent
Cho et al.

(10) Patent No.: US 8,059,728 B2
(45) Date of Patent: Nov. 15, 2011

(54) METHOD AND APPARATUS FOR TRANSMITTING/RECEIVING BROADCAST CHANNELS IN CELLULAR COMMUNICATION SYSTEMS SUPPORTING SCALABLE BANDWIDTH

(75) Inventors: Joon-Young Cho, Suwon-si (KR); Ju-Ho Lee, Suwon-si (KR); Kyeong-In Jeong, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1312 days.

(21) Appl. No.: 11/705,558

(22) Filed: Feb. 12, 2007

(65) Prior Publication Data

US 2007/0217440 A1    Sep. 20, 2007

(30) Foreign Application Priority Data

Feb. 11, 2006   (KR) .................. 10-2006-0013351
Mar. 21, 2006   (KR) .................. 10-2006-0025870

(51) Int. Cl.
    *H04K 1/10* (2006.01)
(52) U.S. Cl. ............ 375/260; 370/320; 370/335; 398/78
(58) Field of Classification Search ........................ None
    See application file for complete search history.

(56) References Cited

U.S. PATENT DOCUMENTS

| | | |
|---|---|---|
| 2004/0174927 A1 | 9/2004 | Cooper |
| 2005/0063331 A1 | 3/2005 | Kim et al. |
| 2005/0249164 A1 | 11/2005 | Kwak et al. |

FOREIGN PATENT DOCUMENTS

| | | |
|---|---|---|
| EP | 0 938 193 | 8/1999 |
| KR | 1020040013129 | 2/2004 |
| KR | 1020050029254 | 3/2005 |
| KR | 1020050106351 | 11/2005 |

OTHER PUBLICATIONS

Ericsson et al.: "Text Proposal on Cell Search in Evolved UTRA", TSG-RAN WG1 #43, R1-051308, Nov. 7-11, 2005.
NTT DoCoMo et al.: "Physical Channel Concept for Scalable Bandwidth in Evolved UTRA Downlink", 3GPP TSG RAN WG1 #42 on LTE, R1-050706, Aug. 29, 2005.

*Primary Examiner* — David C. Payne
(74) *Attorney, Agent, or Firm* — The Farrell Law Firm, P.C.

(57) ABSTRACT

Provided is a method and an apparatus for transmitting/receiving a Broadcast Channel (BCH), by which a User Equipment (UE) can successfully receive system information of neighboring cells in a system supporting the scalability of a UE reception bandwidth and a system bandwidth. The method includes identifying a system bandwidth of a cell by comparing the system bandwidth with reception bandwidths of UEs within the cell, mapping two BCH information blocks including system information to a central band having a bandwidth equal to a transmission bandwidth of the BCH, additionally mapping at least one of the information blocks into each of one-half bands of the system bands, when the system bandwidth is two times an amount of the reception bandwidth, and transmitting a frequency domain signal, to which the information blocks are mapped, to the UEs located within the cell.

16 Claims, 13 Drawing Sheets

METHOD AND APPARATUS FOR TRANSMITTING/RECEIVING BROADCAST CHANNELS IN CELLULAR COMMUNICATION SYSTEMS SUPPORTING SCALABLE BANDWIDTH

PRIORITY

This application claims the benefit under 35 U.S.C. §119(a) of applications entitled "Method And Apparatus For Transmitting/Receiving Broadcast Channels In Cellular Communication Systems Supporting Scalable Bandwidth" filed in the Korean Industrial Property Office on Feb. 11, 2006 and assigned Serial No. 2006-13351, and on Mar. 21, 2006 and assigned Serial No. 2006-25870, the contents of both of which are hereby incorporated by reference.

BACKGROUND OF THE INVENTION

1. Field of the Invention

The present invention relates generally to a cellular wireless communication system, and more particularly to a method and an apparatus for transmitting/receiving system information through a Broadcast Channel (BCH).

2. Description of the Related Art

Orthogonal Frequency Division Multiplexing (OFDM) technology is widely applied in the recent development in broadcasting and mobile communication technology. OFDM technology eliminates interference between multi-path signal components existing in a wireless communication channel, guarantees the orthogonality between multiple access users, and enables efficient use of frequency resources. Therefore, OFDM technology is more useful for high speed data transmission and wideband systems than Direct Sequence Code Division Multiple Access (DS-CDMA) technology, such as Wideband Code Division Multiple Access (WCDMA) or CDMA 2000.

FIG. 1 illustrates a structure of an OFDM signal in a frequency and time domain.

Referring to FIG. 1, one OFDM symbol 100 occupies N number of sub-carriers 102 in view of the frequency domain. The sub-carriers 102 are simultaneously transmitted in parallel after being loaded on modulation symbols (or sub-carrier symbols) of transmitted information, respectively. As described above, the OFDM technology is multi-carrier transmission technology, which can transmit data and control information by multiple sub-carriers. In an OFDM-based communication system, each physical channel includes at least one sub-carrier symbol 104.

One important characteristic of an OFDM-based cellular wireless communication system for providing a high speed wireless data service is the ability to support a scalable bandwidth. A system based on the scalable bandwidth can have various system bandwidths, such as 20/15/10/5/2.5/1.25 MHz. Service providers can provide a service after selecting one of the bandwidths for each cell, and types of User Equipment (UE) may range from those capable of providing a service with a reception bandwidth of maximum 20 MHz to those capable of supporting only a reception bandwidth of at most 1.25 MHz.

In a scalable bandwidth-based system, a UE accessing the system for the first time is required to make a successful cell search even without information about the system bandwidth. Through the cell search, the UE acquires a cell ID and synchronization between a transmitter and a receiver for demodulation of data and control information. The system bandwidth can be obtained from either a Synchronization Channel (SCH) during the cell search or a Broadcasting Channel (BCH) after the cell search, which is a common control channel for transmission of system information. The BCH is a channel for transmitting system information of a cell which the UE accesses, and is demodulated after the UE finishes the cell search. The UE successfully acquires initial synchronization of a particular cell by searching the cell through the SCH and then acquires the system information for the cell by receiving the BCH. That is, by reading the BCH, the UE acquires system information necessary for receiving a data channel and other control channels for each cell, such as a cell ID, a system bandwidth and channel setup information.

FIG. 2 illustrates examples of frequency resource mapping of the SCH and the BCH according to a system bandwidth in a conventional system supporting a scalable bandwidth.

In FIG. 2, the vertical axis corresponds to a frequency domain, which illustrates frequency mapping according to system bandwidths of 1.25/2.5/5/10/15/20 MHz. As shown, the sequence of the SCH 204 and the system information of the BCH 206 are transmitted in the middle of the system band with a bandwidth of 1.25 MHz regardless of the system bandwidth. Therefore, the UE searches a Radio Frequency (RF) carrier 202, which is a central frequency of the system band, regardless of the system bandwidth, and performs cell search for the central band of 1.25 MHz centering the RF carrier 202, thereby detecting the SCH 204 and acquiring initial synchronization for the system. Further, after the cell search, the UE demodulates and decodes the BCH 206 transmitted in the same 1.25 MHz band, thereby obtaining the system information.

FIG. 3 illustrates a case in which each of the SCH and the BCH has a changing transmission bandwidth according to the system bandwidth. That is, the sequence of the SCH 304 and the system information of the BCH 306 are transmitted with a bandwidth of 1.25 MHz when the system bandwidth does not exceed 2.5 MHz, while the sequence of the SCH 304 and the system information of the BCH 306 are transmitted with a bandwidth of 5 MHz when the system bandwidth has a value of at least 5 MHz. This is in order to transmit the SCH sequence and the BCH system information by using a wider band in the case of a larger system bandwidth, thereby improving performance in cell search and system information reception.

In a system supporting the scalable bandwidth, it is necessary to design the channels such that a UE having a reception bandwidth smaller than the system bandwidth can successfully perform SCH search and BCH reception from neighboring cells even when the UE receives a service in a part of the system bandwidth.

SUMMARY OF THE INVENTION

Accordingly, the present invention has been made to solve the above-mentioned problems occurring in the prior art, and an object of the present invention is to provide a method and an apparatus for transmitting/receiving a BCH, by which a UE can successfully receive system information of neighboring cells in a system supporting the scalability of a UE reception bandwidth and a system bandwidth.

It is another object of the present invention to provide a method and an apparatus for transmitting/receiving a BCH, by which a UE can successfully receive system information of neighboring cells either when the UE is receiving broadcast service data in an idle mode or an active mode.

It is another object of the present invention to provide a method and an apparatus by which a UE can successfully receive broadcast service data regardless of whether the UE is in an idle mode or an active mode.

In order to accomplish these objects, there is provided a method for transmitting a BCH carrying system information in a cellular communication system, which supports a scalable bandwidth and uses multiple access technology, the method including mapping BCH modulation symbols including system information to a central band of a system band, the central band having a bandwidth equal to a transmission bandwidth of the BCH, wherein the BCH modulation symbols are divided into two resource blocks; additionally mapping at least part of the BCH modulation symbols into each of one-half bands of the system bands, when the system bandwidth is two times or larger than the maximum reception bandwidth of the UE; and transmitting a frequency domain signal to which the resource blocks are mapped, to the UEs located within the cell.

In accordance with the present invention, there is provided a method for receiving a BCH carrying system information in a cellular communication system, which supports a scalable bandwidth and uses multiple access technology, the method including receiving BCH modulation symbols including system information through sub-carriers in a central band of a system band, when a UE camps in the central band or a system bandwidth of a current cell in which the UE is located is smaller than two times the size of a reception bandwidth of the UE, the central band having a bandwidth equal to the reception bandwidth of the UE, wherein the BCH modulation symbols are divided into two resource blocks; receiving the BCH modulation symbols through sub-carriers in a camped band in which the UE camps, when the system bandwidth is equal to or larger than two times the amount of the reception bandwidth of the UE and the UE camps in a lower band or an upper band, which is a part of the system band; and obtaining the system information by decoding the BCH modulation symbols.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness. Further, various specific definitions found in the following description are provided only to help general understanding of the present invention, and it will be apparent to those skilled in the art that the present invention can be implemented without such definitions.

The present invention is provided to efficiently arrange a frequency band, in which a common control channel such as the SCH or BCH is located, in a cellular communication system which uses multiple access technology and supports a scalable bandwidth.

The following description of embodiments of the present invention mainly discusses a system based on an OFDM transmission technology. However, the present invention can be applied to any other communication system having similar technical background and channel types without departing from the scope of the invention, as will be apparent to one skilled in the art.

Figure 1:
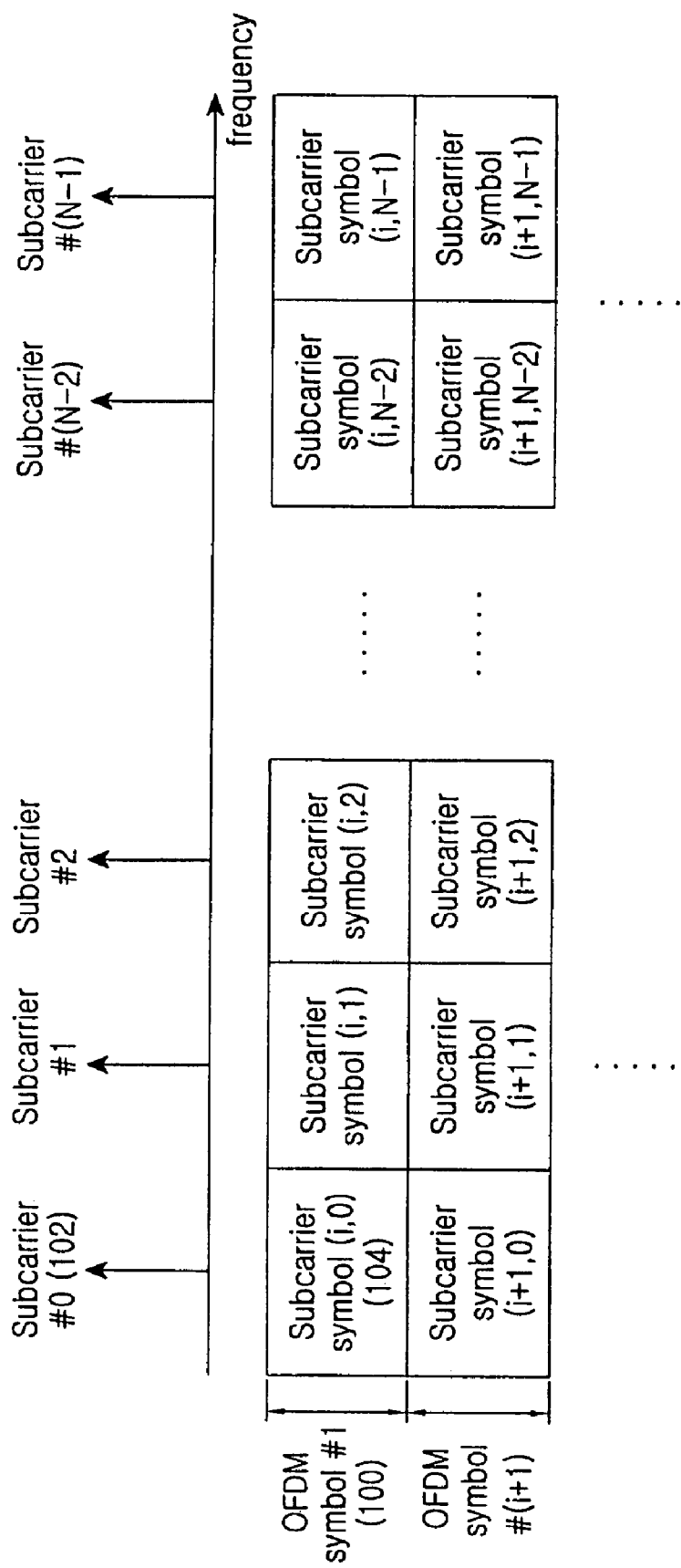
FIG. 1 illustrates a conventional structure of an OFDM signal in a frequency and time domain.
Figure 2:
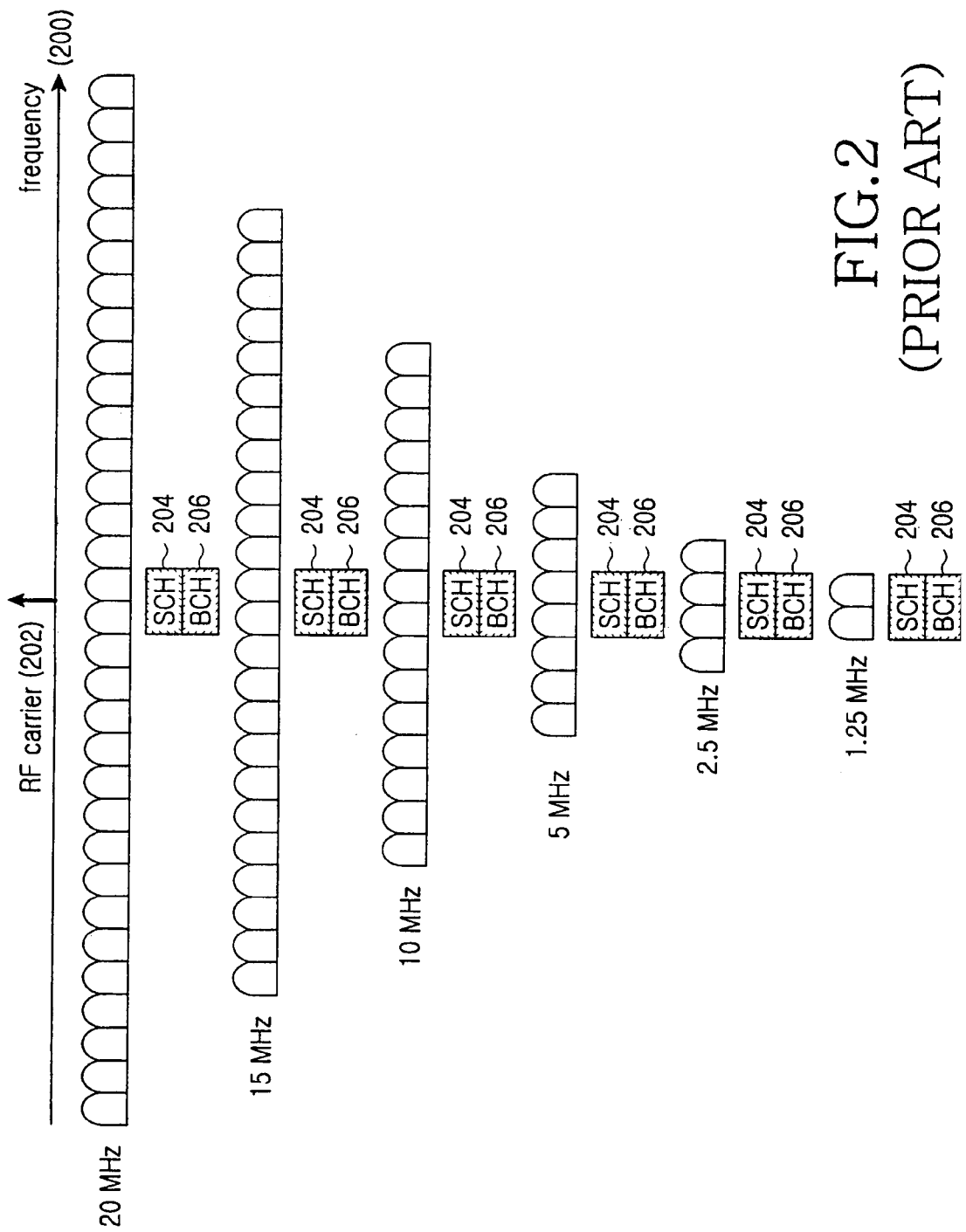
FIG. 2 illustrates examples of frequency resource mapping of the SCH and the BCH according to a system bandwidth in a conventional system supporting a scalable bandwidth.
Figure 3:
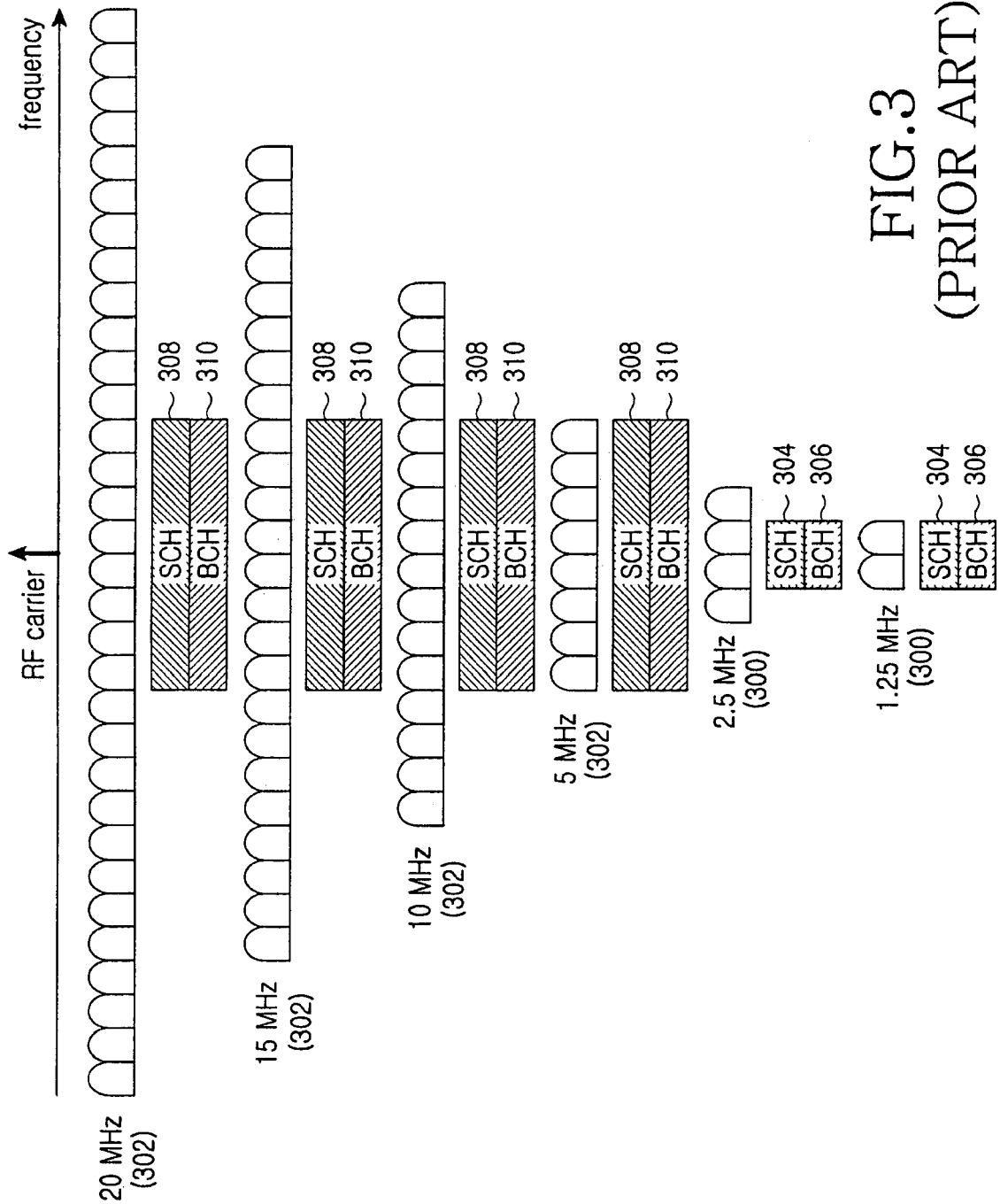
FIG. 3 illustrates a conventional case in which each of the SCH and the BCH has a changing transmission bandwidth according to the system bandwidth.
Figure 4:
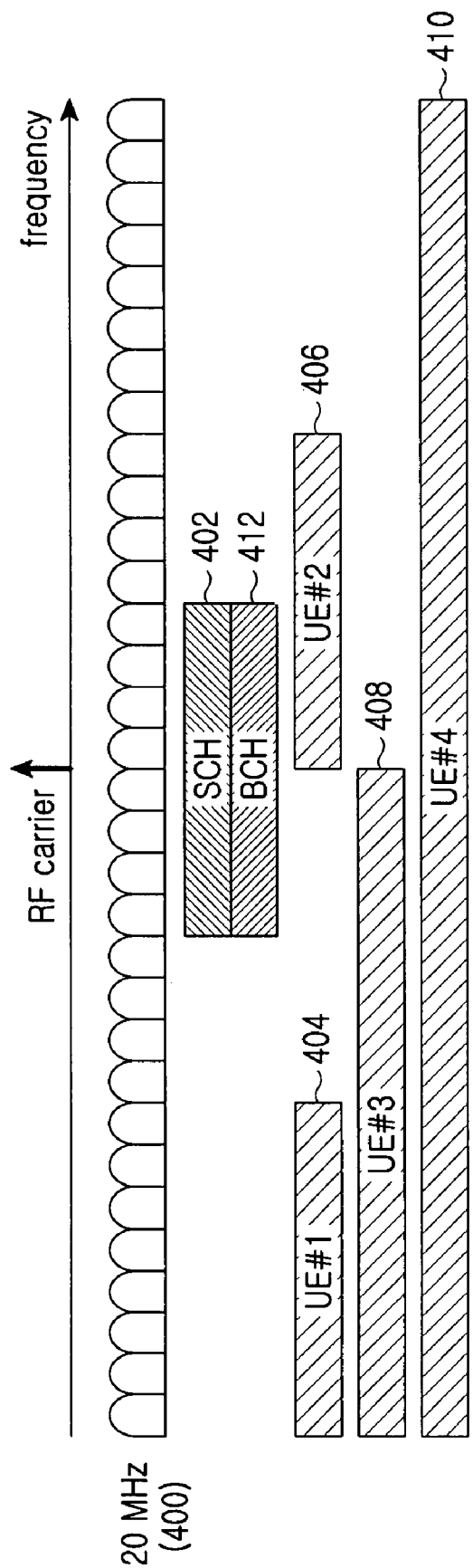
FIG. 4 illustrates an example in which various UEs having various reception bandwidths in an idle mode receive a service from a system having a system bandwidth.

One of the main differences between the scalable bandwidth supporting systems and the conventional systems is that various UEs capable of supporting different reception bandwidths exist within one scalable bandwidth supporting system. For example, FIG. 4 illustrates a status in which UE #1 404, UE #2 406, UE #3 408 and UE #4 410 having reception bandwidths of 5/10/20 MHz receive a service from a system having a system bandwidth of 20 MHz. In FIG. 4, reference numeral 402 denotes the SCH sequence transmitted from the system, and reference numeral 412 denotes the system information carried by the BCH. The physical information carried by the BCH 412 is usually generated through channel encoding.

Referring to FIG. 4, the SCH 402 and the BCH 412, are transmitted with a bandwidth of 5 MHz based on the RF sub-carrier that has a center frequency of the system bandwidth within all cells of the system. The UEs 404, 406, 408, and 410 receive a data service in a corresponding band of a current cell in which each UE is currently located, after finishing the cell search and system information reception from the SCH 402 and the BCH 412. The UEs 404, 406, 408, and 410 camp in different bands within the entire system band 400 in order to distribute the bands used by the UEs 404, 406, 408, and 410 within the system band 400, thereby preventing frequency resource requests and traffic occurrence from concentrating in a particular band.

In the status shown in FIG. 4, although UE #2 406, UE #3 408 and UE #4 410 can receive all or a part of the SCH 402 and the BCH 412 transmitted from neighboring cells, UE #1 404 cannot receive signals of the channels 402 and 412 in the current band because UE #1 404 is located in the lowest 5 MHz band in which the SCH 402 and the BCH 412 are not transmitted. Therefore, in order to enable UE #1 404 to receive signals of the SCH 402 and the BCH 412 from neighboring cells, UE #1 404 must temporarily move its reception RF sub-carrier to the frequency band in which the SCH 402 and the BCH 412 are transmitted. Meanwhile, UE #2 406 and UE #3 408 can receive only a partial band of the signal of the BCH 412 in the 5 MHz and 10 MHz bands in which they are currently located. Therefore, in order to normally decode the signal of the BCH 412, the UEs 406 and 408 also must move their reception RF sub-carriers to the frequency band in which the BCH 412 is transmitted.

Figure 5:
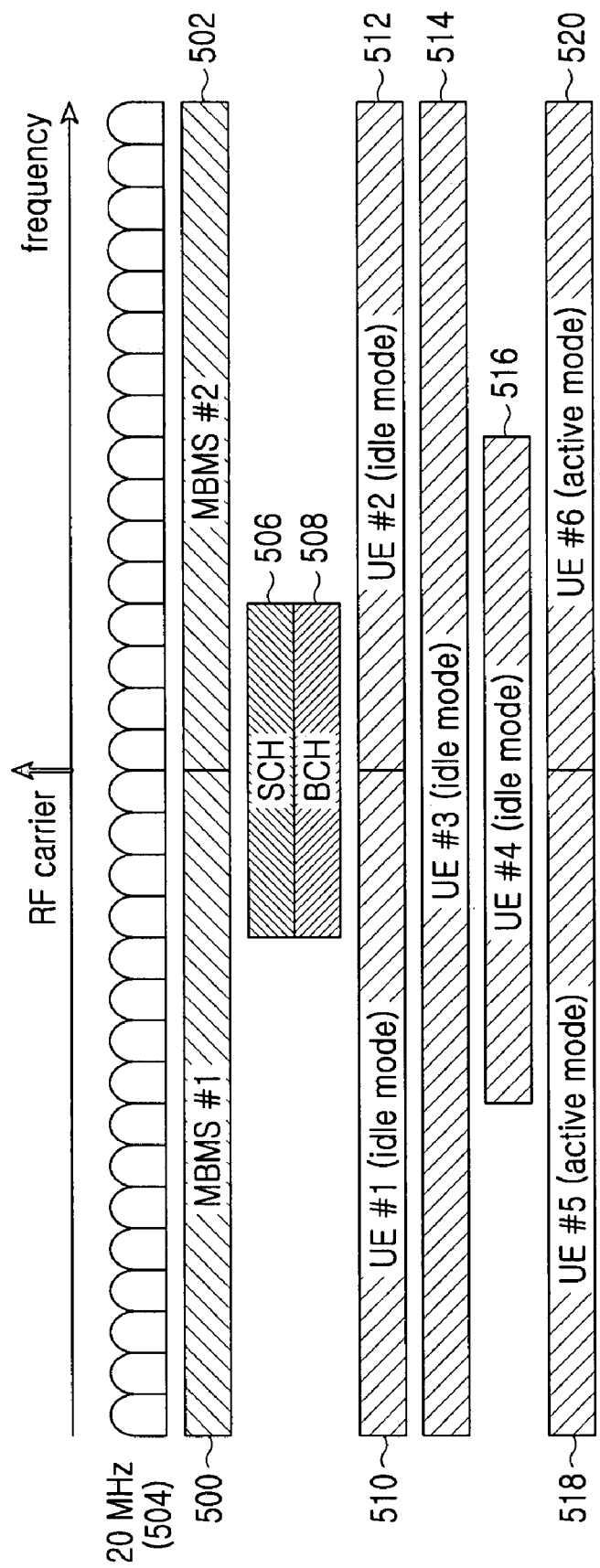
FIG. 5 illustrates an example in which UEs capable of accessing the system and having various bandwidths, including a UE in the idle mode, are distributed within the entire system band.

FIG. 5 illustrates an example in which UEs capable of accessing the system and having various bandwidths, including a UE in the idle mode, are distributed within the entire system band.

Referring to FIG. 5, when the UEs capable of accessing the system have a reception bandwidth of at least 10 MHz, MBMS #1 500 and MBMS #2 502, which are physical channels for the Multimedia Broadcast Multicast Service (MBMS), are transmitted in the upper 10 MHz band and lower 10 MHz band, which are half-bands of the system band 504 having a bandwidth of 20 MHz.

MBMS #1 500 and MBMS #2 502 are channels for providing multimedia data to multiple users in a broadcast or multicast form, and various broadcast service channels are provided through MBMS #1 500 and MBMS #2 502.

UE #3 514 in an idle mode, which has a bandwidth of 20 MHz, can normally receive all signals of the SCH 506, the BCH 508 and the MBMS channels 500 and 502. Further, UE #4 516 in the idle mode, which does not receive the MBMS service, stays at the central position of the system band and continuously receives the SCH 506 and the BCH 508 from neighboring cells, thereby preparing for entrance into the active mode by performing cell search and system information reception.

Meanwhile, UE #1 510 and UE #2 512 having a reception capability of 10 MHz are in the idle mode and receive the MBMS physical channels 500 and 502 in the upper and lower bands in which MBMS physical channels including desired broadcast service channels are transmitted. However, because UE #1 510 and UE #2 512 are in the idle mode, they need to receive the SCH 506 and the BCH 508 from neighboring cells in order to prepare to enter into the active mode when necessary, as well as receiving the MBMS data.

UE #1 510 and UE #2 512 can receive only a partial band of the SCH 506 and the BCH 508. With the SCH 506, it is possible to perform cell search even by only a partial band of the SCH. However, with the BCH 508, it is nearly impossible to normally decode the entire system information without receiving all sub-carrier symbols of the BCH 508. In order to enable normal decoding of the BCH 508, UE #1 510 and UE #2 512 need to change their own reception RF sub-carrier bands to transmission bands for the BCH 508, receive the system information through the BCH 508, and then change the transmission bands back to the transmission bands for the MBMS channels 500 and 502. Therefore, it is difficult to achieve successful reception of MBMS data and successful search of neighboring cells.

If the MBMS channels 500 and 502 are transmitted in the middle of the system band such as the BCH 508, in order to enable UE #1 510 and UE #2 512 to simultaneously receive the BCH 508 and the MBMS data, a UE of an active mode located in one of the two one-half bands such as UE #3 408 of FIG. 4 can only receive partial bands of the MBMS channels 500 and 502 and cannot normally restore data of the MBMS channels. Therefore, in a system supporting a scalable bandwidth, in order to enable all UEs in both the idle mode and the active mode to normally receive broadcast service data, the UEs of the active mode such as UE #5 518 and UE #6 520 shown in FIG. 5 need to transmit MBMS channels 500 and 502 in accordance with the allocated one-half bands. Further, as described above with reference to FIG. 4, in order to achieve uniform utilization of all frequency resources and prevent traffic overload of a particular band, it is necessary to uniformly distribute UE #5 518 and UE #6 520 of the active mode over the entire frequency bands.

Embodiments described below present a BCH mapping scheme by which a UE can normally receive and decode BCH signals from neighboring cells when the UE is in an active mode or even when the UE is not located in a central position of the system band, such as when the UE receives the MBMS data in an idle mode. Specifically, BCHs are defined through proper rearrangement and reuse of BCH resources, wherein one BCH is used in most cases and an additional BCH is used for a UE in the active mode or a UE receiving broadcast service data in the idle mode when the system bandwidth is at least two times the reception bandwidth of the UE. Therefore, according to the present invention, there is no problem in initial cell search in a state in which the UE does not know the system bandwidth, and the UE can use the additional BCH defined by resource reuse of the BCH when the UE receives system information of neighboring cells while receiving the broadcast service data in the idle mode.

$1^{st}$ Embodiment

The first embodiment of the present invention relates to when a minimum of 10 MHz is allowed for a reception bandwidth of a UE within the system bandwidth and the transmission bandwidth of the BCH is 1.25 MHz regardless of the system bandwidth. Therefore, when the system bandwidth is 20 MHz, the UE may have a reception bandwidth of 10, 15, or 20 MHz. When the system bandwidth is smaller than 10 MHz, the entire system bandwidth is allocated as the reception bandwidth of the UE.

Figure 6:
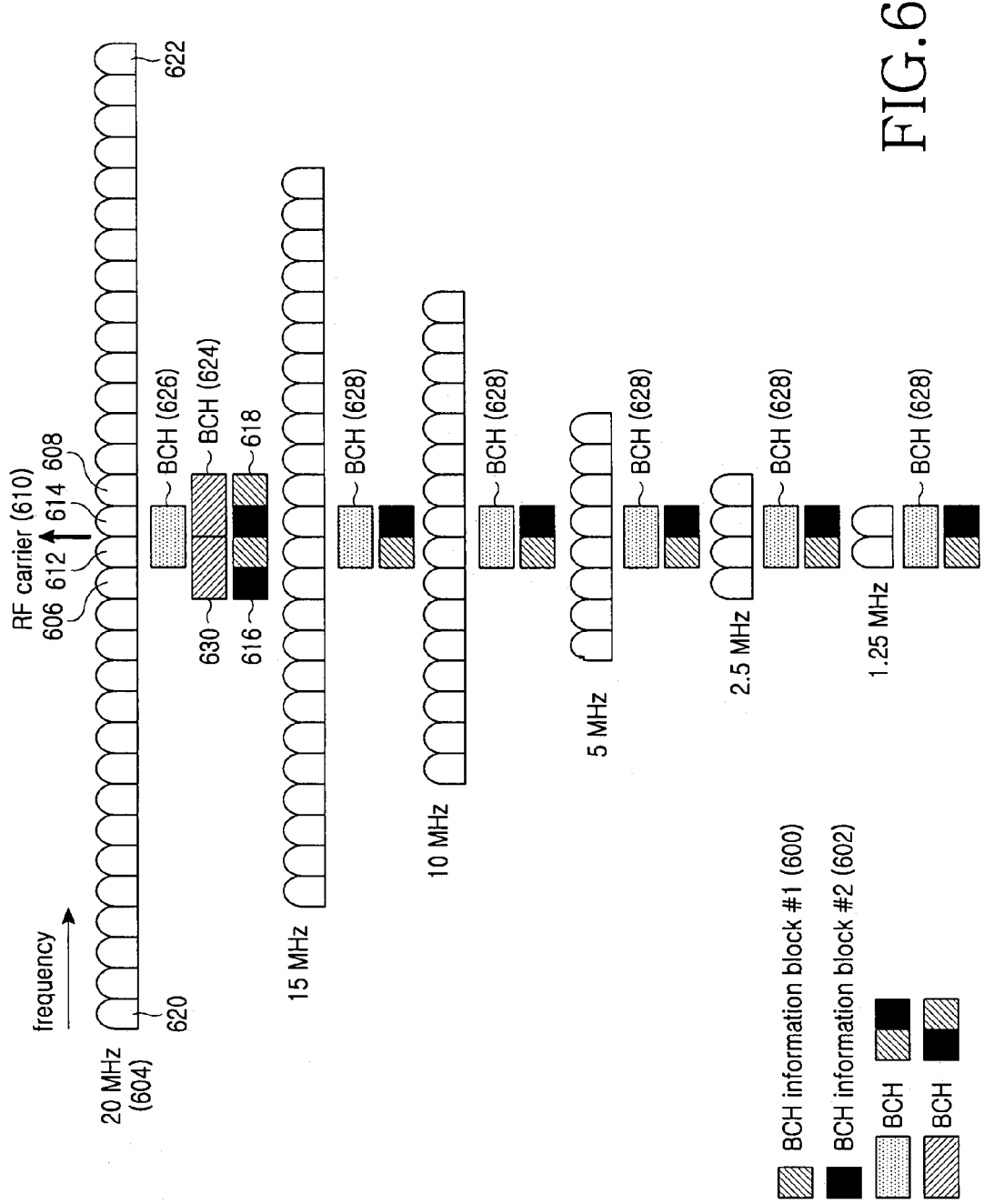
FIG. 6 illustrates frequency domain mapping of the BCH according to the first embodiment of the present invention.

FIG. 6 illustrates frequency domain mapping of the BCH according to the first embodiment of the present invention. As shown, the sub-carrier symbols constituting the system information of the BCH are divided into two resource blocks 600 and 602. As used herein, each of the sub-carrier symbols refers to a modulation symbol mapped to one sub-carrier and each of the resource blocks consists of modulation symbols mapped to a BCH bandwidth of 1.25 MHz.

Referring to FIG. 6, in the entire system bandwidth, two BCH resource blocks 600 and 602 are transmitted in the lower and upper 625 kHz bands 612 and 614 adjacent to the RF carrier 610. However, when the system bandwidth is 20 MHz 604, resource blocks 618 and 616, which are the same as the resource blocks 600 and 602, are transmitted after being repeated in the additional 625 kHz bands 606 and 608 adjacent to the bands 612 and 614. The sub-carrier symbols constituting the resource block 602 are transmitted after being mapped to the time frequency resources according to the same mapping rule in the bands 606 and 614. That is, the sub-carrier symbols of the resource block 602 transmitted in the band 606 are the same as the sub-carrier symbols transmitted in the band 614. Also, sub-carrier symbols constituting the resource block 600 are transmitted after being repeated according to the same mapping rule in the bands 608 and 612.

By mapping the BCH resources in the manner as described above, it is possible to achieve the same effect as transmission of information of three BCHs when the system bandwidth 604 is 20 MHz. The first BCH 626 mapped to the 625 kHz bands 612 and 614 adjacent to the RF carrier 610 is the same as the BCH 628 transmitted in the other system bandwidths, and includes resource blocks 600 and 602 assembled with each other in order. The second BCH 624 mapped to the two 625 kHz bands 614 and 608 within the upper one-half band with reference to the carrier 610 includes resource blocks 602 and 600 assembled with each other in order in view of the frequency domain, and is used for a UE having a 10 MHz reception bandwidth, which is camping in the upper 10 MHz band from among the 20 MHz system bandwidth. The second BCH 624 contains nearly the same system information as that of the BCH 626 only with a difference in the order in which the resource blocks 602 and 600 are mapped in the frequency band. Similarly, the third BCH 630 mapped to the two 625 kHz bands 606 and 612 within the lower one-half band with reference to the carrier 610 is used for a UE camping in the lower 10 MHz and includes resource blocks 602 and 600 assembled in order.

By repeatedly mapping the resource blocks 600 and 602 as described above, it is possible to achieve the effect of transmission of the three BCHs 626, 624, and 630. In a state in which a UE is connected to a cell having a system bandwidth of 20 MHz, the UE receives the BCH 626 located at the central band of the system band in order to know the system information either directly after the UE performs the initial cell search or when the UE is not receiving data, and the UE receives the additional BCHs 624 and 630 in order to know the system information of neighboring cells when the UE has moved to one of the two 10 MHz bands of the opposite sides.

Although the resource blocks 616 and 618 of the additional BCHs 624 and 630 are transmitted in the bands 606 and 608 adjacent to the central bands 612 and 614 in FIG. 6, they may also be transmitted in any of the 625 kHz bands within both of the one-half bands. For example, even when the two resource blocks 616 and 618 are transmitted in the 625 kHz bands 620 and 622 at the lower and upper edges of the 20 MHz band 604, respectively, a UE located in one of the two one-half bands can normally receive the system information from neighboring cells while receiving the broadcast service data.

That is, two BCH resource blocks (block #1 and block #2) 600 and 602 are transmitted in the central bands 612 and 614, and the BCH resource blocks are repeated and transmitted at one position within each one-half band, that is, within each of the lower 10 MHz band and the upper 10 MHz band. Then, two different resource blocks 600 and 602 are located within each of the 10 MHz bands, and a UE located within one of the 10 MHz bands can receive and decode all of the two resource blocks 600 and 602, thereby normally restoring the system information. Further, the UE located in the central 10 MHz band can receive all of the four resource blocks and can assemble the repeated resource blocks, thereby improving the decoding capability of the system information.

Although FIG. 6 illustrates the case in which the BCH has the 1.25 MHz bandwidth regardless of the system bandwidth, the BCH transmission method through rearrangement and reuse of the BCH resources disclosed in the first embodiment of the present invention can also be applied to another case in which the BCH has a bandwidth other than 1.25 MHz. Moreover, this method can be applied to a different channel as well as the BCH, for reception of the different channel from neighboring cells.

Figure 7:
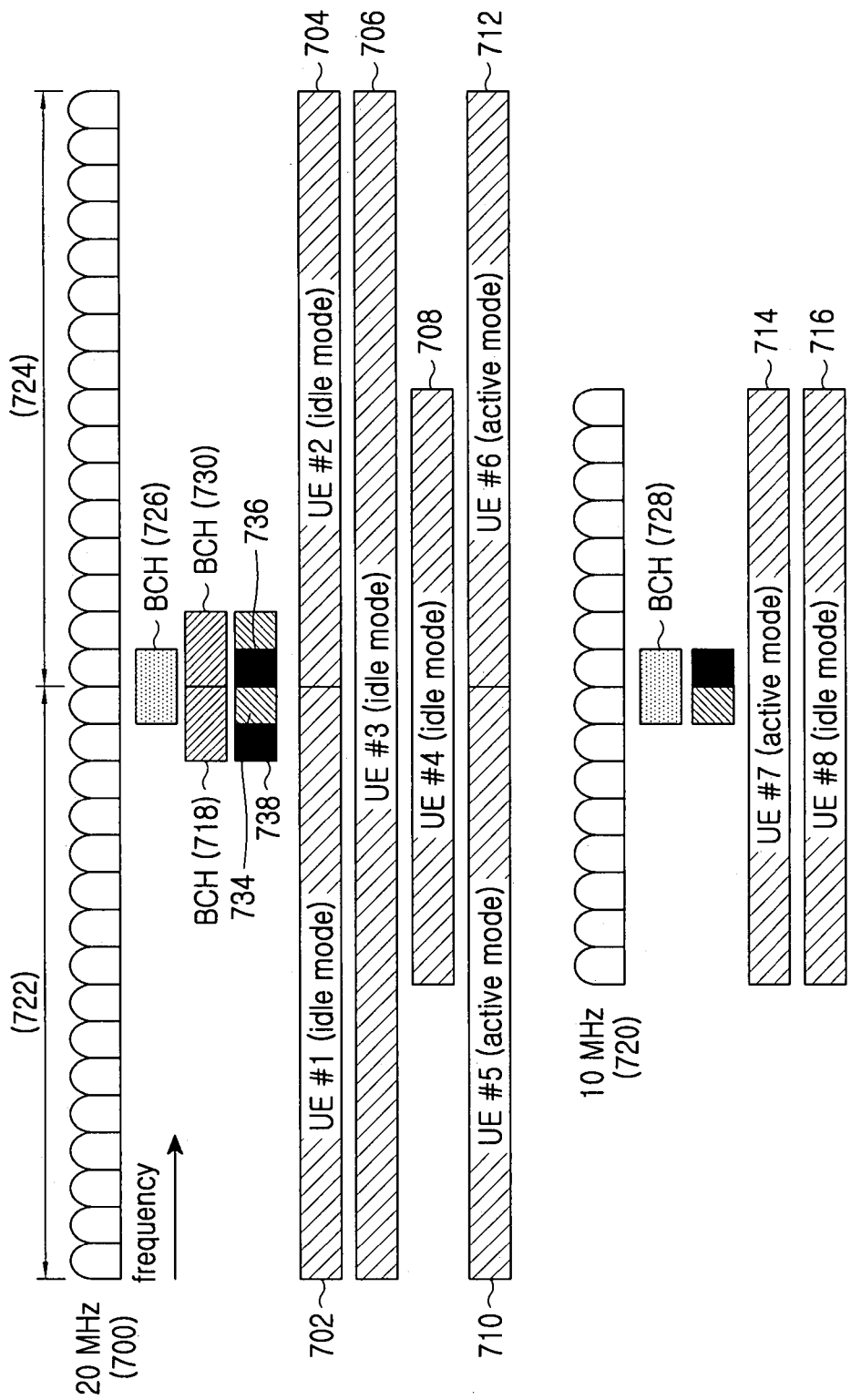
FIG. 7 illustrates an example in which UEs having various reception bandwidths are allocated within a system bandwidth according to the first embodiment of the present invention.

FIG. 7 illustrates a situation in which UEs having various reception bandwidths exist when the system bandwidth is 20 MHz 700 or 10 MHz 720 according to the first embodiment of the present invention. When the system bandwidth is 10 MHz 720, both UE #7 714 in the active mode and UE #8 716 in the idle mode can receive signals of the entire system band, and thus they can simultaneously receive the BCH 728 from the neighboring cells along with data from the current cell.

When the system bandwidth is 20 MHz 700, the operation of the UE is different according to the mode and band to which the UE belongs. First, UE #4 708 is in the idle mode and is located in the 10 MHz band at the center of the system band. UE #4 708 can know the system information of neighboring cells by receiving the BCH 726 mapped to the central 1.25 MHz bands from the neighboring cells. Further, UE #4 708 located at the central bands of the system band can receive and decode the BCH 726 by using the fact that the BCH resource blocks 734 and 736 have been mapped in order to the central 1.25 MHz bands.

UE #1 702 is in the idle mode and is located in the lower 10 MHz band 722. This situation may occur when UE #1 702 receives MBMS data in the idle mode. When UE #1 702 receives system information of neighboring cells, UE #1 702 receives BCH resource blocks 738 and 734 from corresponding 1.25 MHz bands by using the fact that the BCH 718 is transmitted at the upper edge of the lower band 722. The resource block 734 is repeatedly used in the BCH 726 of the central bands and the BCH 718 of the lower band, and the order in which the resource blocks 738 and 734 are mapped in the frequency domain in the BCH 718 is opposite to the order of mapping in the BCH 726.

UE #2 704 located in the upper 10 MHz band 724 is also in the idle mode and operates similarly to UE #1 702, thereby receiving the BCH 730 in the 1.25 MHz band at the lower edge of the upper 10 MHz band 724. Likewise, UE #5 710 and UE #6 712 in the active mode can receive corresponding BCHs 718 and 730 from the current cell and neighboring cells when necessary.

UE #3 706 has a reception bandwidth of 20 MHz and thus occupies all of the 20 MHz system bandwidth regardless of the current mode of UE #3 706. Therefore, UE #3 706 receives only the BCH 726 at the time of initial cell search before UE #3 706 knows the system bandwidth. However, when UE #3 706 is aware of the system bandwidth, UE #3 706 can receive all resource blocks of the BCHs 718 and 730 from the current cell and neighboring cells, thereby improving the decoding capability of the system information.

Figure 8:
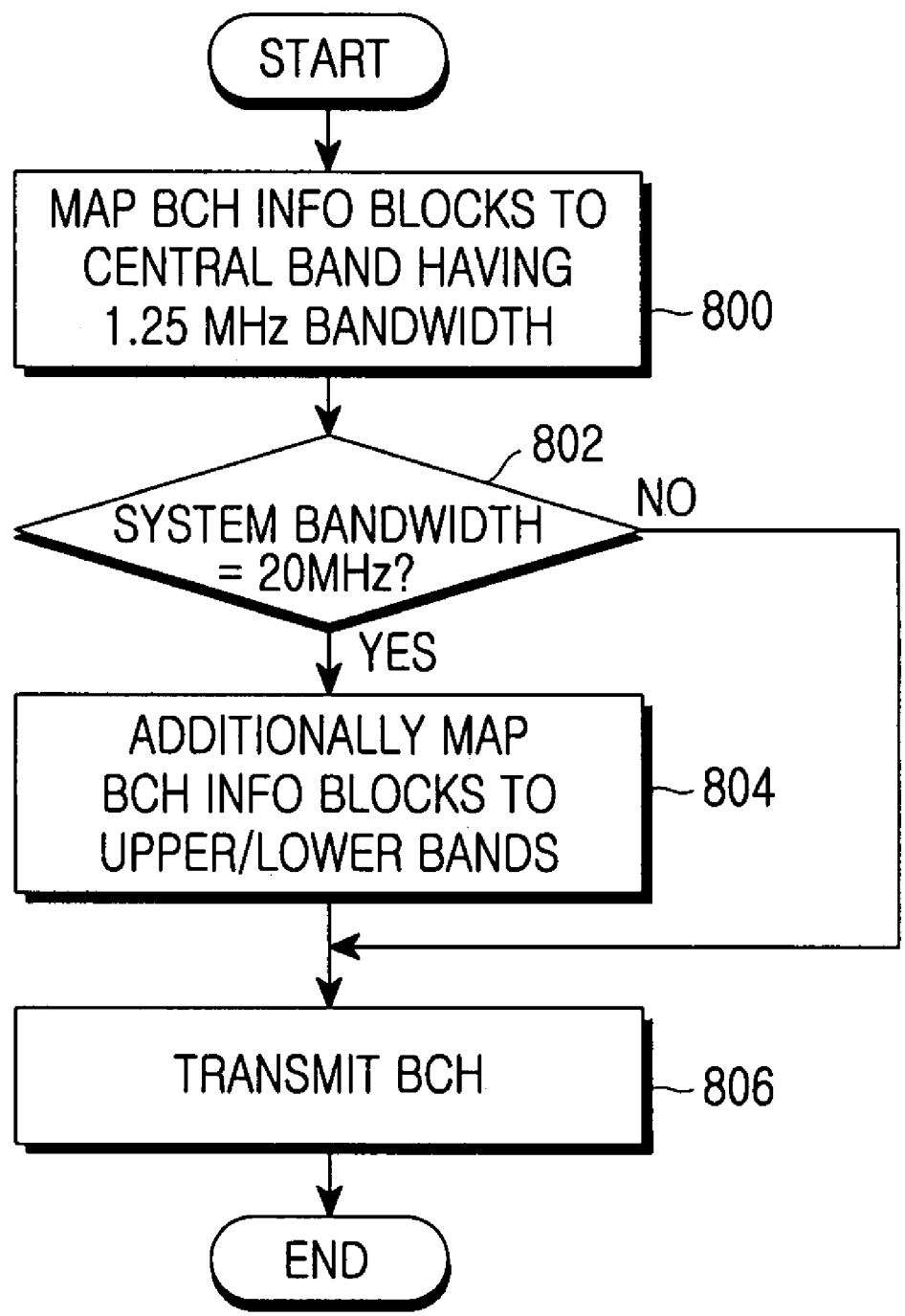
FIG. 8 is a flow diagram illustrating an operation of a node B transmitter according to the first embodiment of the present invention.

FIG. 8 is a flow diagram illustrating an operation of a node B transmitter according to the first embodiment of the present invention.

Referring to FIG. 8, in step 800, the transmitter maps two resource blocks including BCH sub-carrier symbols such as the BCHs 626 and 628 of FIG. 6 to the central bands (having a 1.25 MHz bandwidth) of the system band. In step 802, the transmitter determines whether the system bandwidth is smaller than 20 MHz, which is two times the amount of the UE reception bandwidth. When the system bandwidth is equal to 20 MHz, the transmitter additionally maps the resource blocks to the 625 kHz bands within the upper/lower one-half bands as shown in FIG. 6 in step 804, so that UEs receiving MBMS data or in the active mode can receive the system information by using the BCHs 624 and 630 including the additionally mapped resource blocks. In step 806, the transmitter transmits the frequency domain signals including the mapped resource blocks through corresponding bands to the UE located within the cell.

Figure 9:
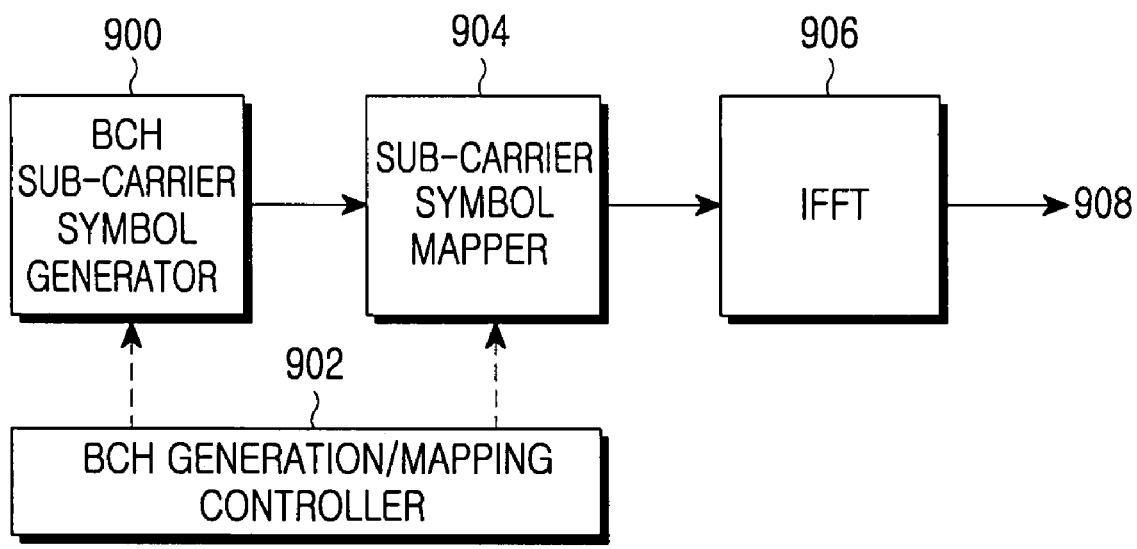
FIG. 9 is a block diagram illustrating a structure of a node B transmitter according to the first embodiment of the present invention.

FIG. 9 is a block diagram illustrating a structure of a node B transmitter according to the first embodiment of the present invention.

Referring to FIG. 9, a BCH sub-carrier symbol generator 900 generates BCH sub-carrier symbols indicating system information, and the BCH sub-carrier symbols are mapped to corresponding BCH bands by a sub-carrier symbol mapper 904 and are then converted to time domain OFDM signals 908 by an Inverse Fast Fourier Transformer (IFFT) 906. When the system bandwidth is 20 MHz, each BCH sub-carrier symbol is repeatedly mapped to two input taps from among the input taps of the IFFT 906 by the sub-carrier symbol mapper 904. Specifically, BCH sub-carrier symbols corresponding to resource block #1 600 are repeatedly mapped to the IFFT input taps corresponding to the two bands 612 and 608, and BCH sub-carrier symbols corresponding to resource block #2 602 are repeatedly mapped to the IFFT input taps corresponding to the two bands 606 and 614.

The mapping operation is performed under the control of the BCH generation/mapping controller 902. That is, the BCH generation/mapping controller 902 provides system information to be transmitted through the BCH to the BCH sub-carrier symbol generator 900 and controls the sub-carrier symbol mapper 904 by determining the mapping positions of the BCH sub-carrier symbols according to the system bandwidth.

Figure 10:
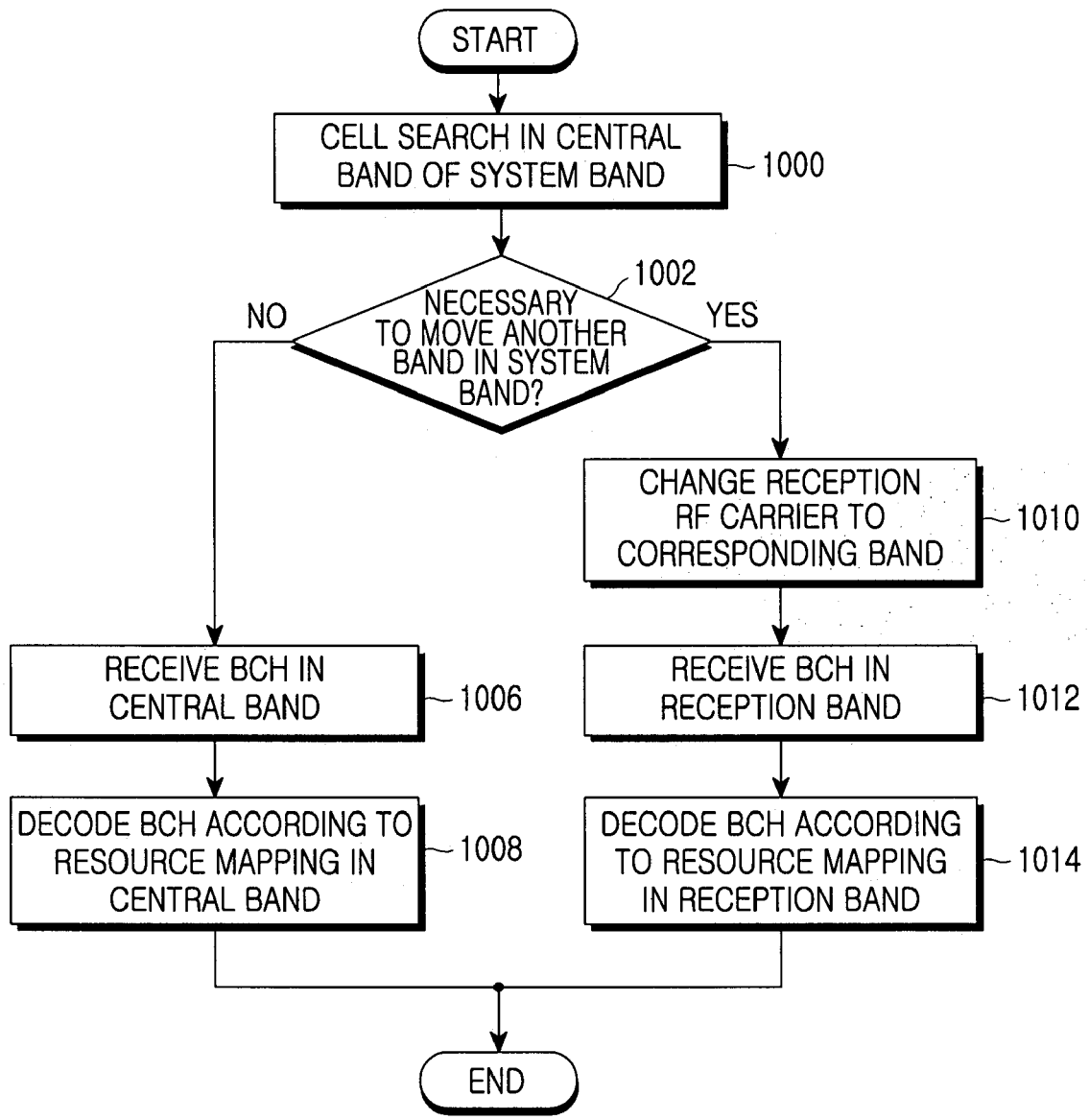
FIG. 10 is a flow diagram illustrating an operation of a UE receiver according to the first embodiment of the present invention.

FIG. 10 is a flow diagram illustrating an operation of a UE receiver according to the first embodiment of the present invention.

Referring to FIG. 10, in step 1000, the UE performs cell search by using a synchronization channel sequence transmitted in the central bands of the system band when the UE is turned on or tries to access a new cell. Thereafter, in step 1002, the UE determines whether it is necessary to move to a particular band within the system band due to an instance such as transition into the active mode or reception of MBMS data. If it is unnecessary to move to a particular band, the UE stays in the central bands while performing the cell search about neighboring cells or reception of BCH resource blocks in step 1006. Then, in step 1008, the UE acquires the system information by decoding the BCH resource blocks based on the mapping rule of the BCH resources in the central bands. The mapping rule of the BCH resources refers to sub-carrier indexes and an OFDM symbol period for transmitting sub-carrier symbols of the BCH.

When the determination in step 1002 concludes that it is necessary to move to a particular band within the system band due to, for example, transition into the active mode or reception of MBMS data, the UE changes the reception RF carrier to the center of the particular band in step 1010. Then, the UE receives BCH resource blocks in the changed band in step 1012, and obtains the system information by decoding the BCH resource blocks according to the BCH resource mapping rule of the changed band in step 1014.

Figure 11:
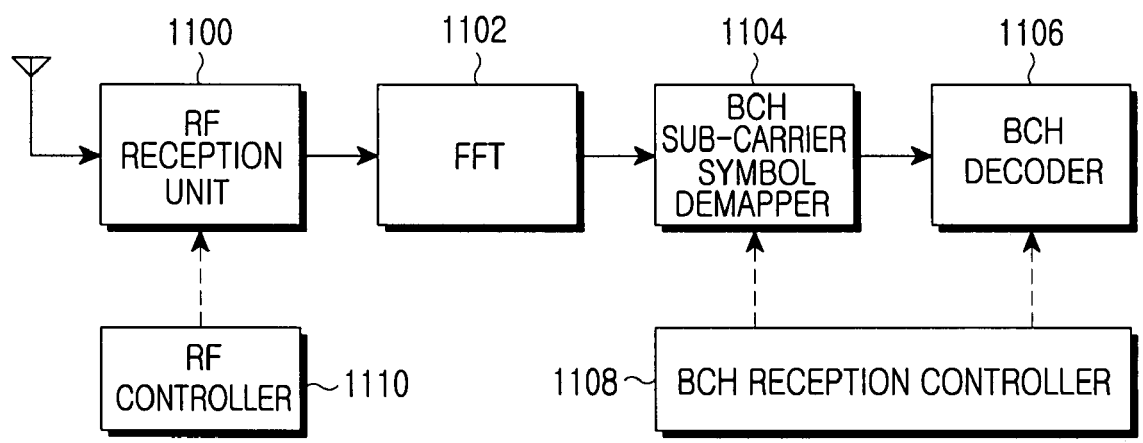
FIG. 11 is a block diagram illustrating a structure of a UE receiver according to the first embodiment of the present invention.

FIG. 11 is a block diagram illustrating a structure of a UE receiver according to the first embodiment of the present invention.

Referring to FIG. 11, an RF controller 1110 controls, for example, a reception RF carrier of an RF reception unit 1100 based on the system bandwidth, the operation mode and the band of the MBMS physical channel being received, so that the RF reception unit 1100 can receive a signal of a desired band. The received signal is converted to sub-carrier symbols by a Fast Fourier Transformer (FFT) 1102, and a BCH sub-carrier symbol demapper 1104 selects and outputs BCH sub-carrier symbols from among the converted sub-carrier symbols according to the resource mapping rule of the BCH. The BCH decoder 1106 decodes the BCH sub-carrier symbols, thereby obtaining the system information transmitted through the BCH. When necessary, the BCH sub-carrier symbols are rearranged in the original order.

The BCH symbol demapping and decoding operation is controlled by the BCH reception controller 1108. Specifically, the BCH reception controller 1108 reports receivable BCH bands according to the system bandwidth and the band of the MBMS physical channel being received to the BCH sub-carrier symbol demapper 1104, and reports the structure (particularly, the order) of the resource blocks constituting the BCH sub-carrier symbols to the BCH decoder 1106.

$2^{nd}$ Embodiment

The second embodiment of the present invention relates to when a minimum of 5 MHz is allowed for a reception bandwidth of a UE within the system bandwidth and the transmission bandwidth of the BCH is 1.25 MHz regardless of the system bandwidth. In this instance, additional transmission of BCH resource blocks is necessary in order to enable a UE to always normally receive system information from neighboring cells even when the system bandwidth exceeds two times the amount of the reception bandwidth.

Figure 12:
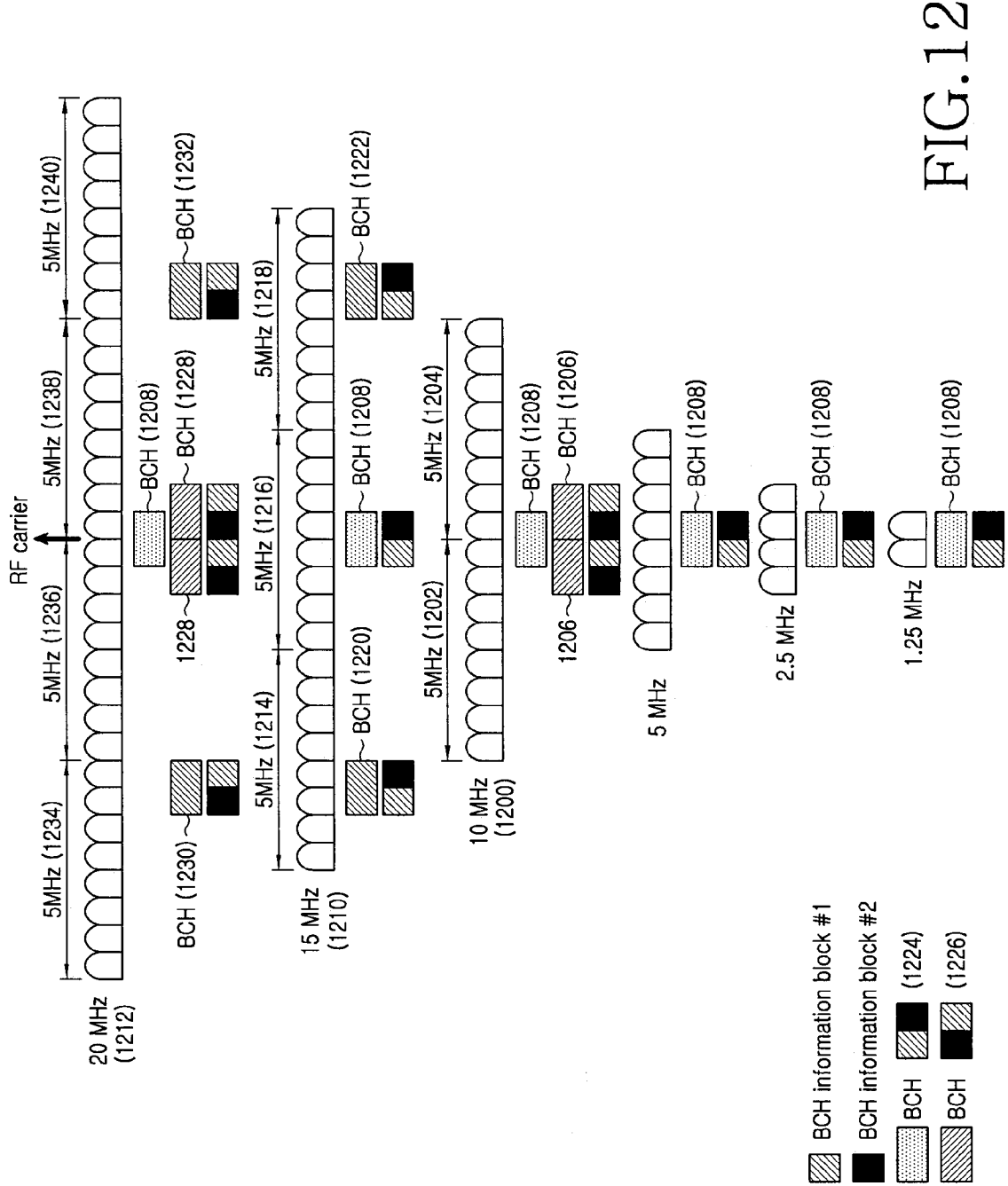
FIG. 12 illustrates frequency domain mapping of the BCH according to the second embodiment of the present invention.

FIG. 12 illustrates frequency domain mapping of the BCH according to the second embodiment of the present invention. As shown, in all cases of the system bandwidth, the BCH 1208 including BCH resource block #1 and BCH resource block #2 in order is transmitted in the central 1.25 MHz bands centering the RF carrier. In the case of 10 MHz system bandwidth 1200, additional BCHs 1206 are transmitted in the 5 MHz bands 1202 and 1204 of both sides. This is the same as when the additional BCHs 630 and 624 are transmitted in the 10 MHz bands of both sides in the 20 MHz system bandwidth 604 in FIG. 6. A UE performs initial cell search by using the BCH 1208 located in the central bands, because it does not know the system bandwidth. When the UE receives MBMS data in an idle mode or an active mode, the UE can receive system information from the BCH 1206 transmitted from one side 5 MHz band 1202 or 1204.

When the system bandwidth is 15 MHz 1210, a UE having a 5 MHz reception bandwidth may exist in one of three 5 MHz bands 1214, 1216 and 1218. Therefore, in order to enable the UE to receive the BCH in any of the three 5 MHz bands 1214, 1216 and 1218, the system transmits additional BCHs 1220 and 1222 in the 5 MHz bands 1214 and 1218 of both sides. Although FIG. 12 shows the use of BCH information 1224 including resource block #1 and resource block #2 in order in the additional BCHs 1220 and 1222, BCH information 1226 including resource block #2 and resource block #1 in order may be used, and the structure of the BCH information used in the allocated BCH band is set in advance between the system and the UE as a BCH resource mapping rule. Further, in each of the 5 MHz bands 1214, 1216 and 1218, the resource blocks may be transmitted while being distributed in corresponding 5 MHz bands instead of being located adjacent to each other.

When the system bandwidth is 20 MHz 1212, which may include four 5 MHz bands 1234, 1236, 1238 and 1240, the BCH is repeatedly transmitted in the four bands 1234, 1236, 1238 and 1240. Therefore, the BCH 1228 transmitted in the central bands located in the two central 5 MHz bands 1236 and 1238 is generated by repeating resource blocks of the BCH 1208 mapped to the central 1.25 MHz bands, and the BCHs 1230 and 1232 transmitted in the 5 MHz bands 1234 and 1240 of both sides are generated by additionally allocating the same resource blocks as those of the BCH 1208. The resource blocks of the BCHs 1230 and 1232 may have a structure of the BCH information 1224 or the BCH information 1226, and the resource blocks may be transmitted while being distributed in each of the bands 1234 and 1240 instead of being located adjacent to each other.

The operation and structure of a node B and a UE according to the second embodiment of the present invention are similar to those of the first embodiment of the present invention, so a detailed description thereof will be omitted here.

3<sup>rd</sup> Embodiment

The third embodiment of the present invention relates to when a minimum of 10 MHz is allowed for a reception bandwidth of a UE within the system bandwidth and the transmission bandwidth of the BCH is 1.25 MHz regardless of the system bandwidth.

Figure 13:
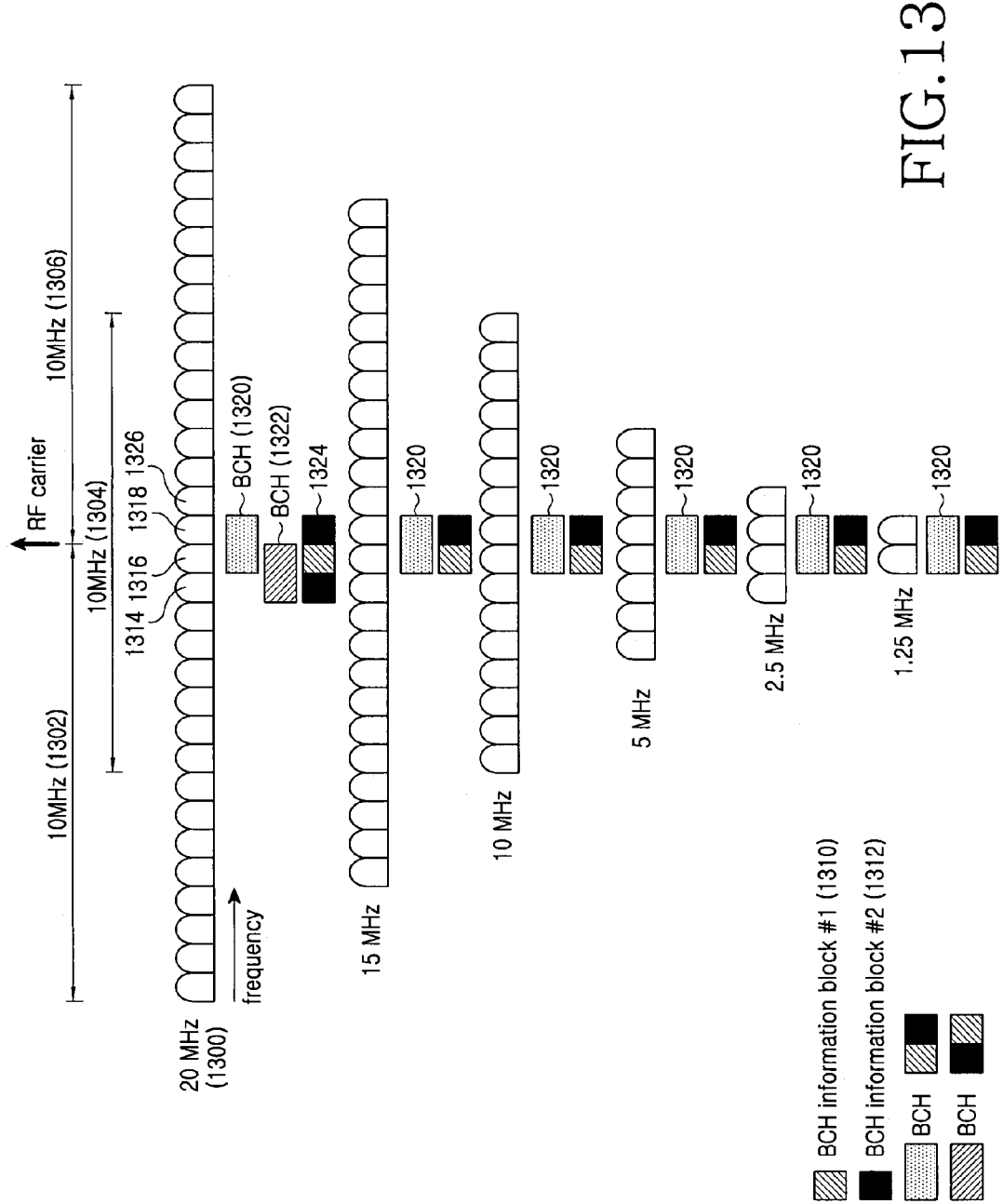
FIG. 13 illustrates frequency domain mapping of the BCH according to the third embodiment of the present invention.

FIG. 13 illustrates frequency domain mapping of the BCH according to the third embodiment of the present invention. As shown, in all cases of the system bandwidth, the BCH 1320 including BCH resource block #1 1310 and BCH resource block #2 1312 in order is transmitted in the central 1.25 MHz bands centering the RF carrier. When the system bandwidth is 20 MHz 1300, BCH resource blocks 1310 and 1312 are transmitted in the 625 kHz bands 1316 and 1318 adjacent to the RF carrier and in an additional 625 kHz band 1314. The difference between the structure in FIG. 13 and the structure in FIG. 6 according to the first embodiment is that no BCH resource block is mapped to any of the 625 kHz bands 1326 within the upper 10 MHz band 1306. Therefore, according to the third embodiment of the present invention, two BCHs 1320 and 1322 are transmitted when the system bandwidth is 20 MHz.

The first BCH 1320 is received by a UE having a 10 MHz reception bandwidth, which is located at the central 10 MHz band 1304 after performing initial cell search through the SCH. That is, after completing the initial cell search for the current cell and reception of the BCH, the UE performs cell search for the neighboring cells and obtains system information of the neighboring cells by receiving the BCH 1320 from the neighboring cells, while staying in the central 10 MHz band 1304. Meanwhile, the second BCH 1322 is received after the cell search for the neighboring cells when the UE is receiving MBMS data in the lower 10 MHz band 1302 in the idle mode.

In contrast to the first embodiment, an additional BCH is not mapped to the upper 10 MHz band 1306, because the UE need not receive the system information from the neighboring cells in the upper 10 MHz band 1306. That is, when there is no transmission of MBMS data in the upper band 1306 and a UE in an idle mode need not exist in the band 1306, or when a UE in an active mode need not receive system information from neighboring cells, BCH resource blocks 1310 and 1312 are mapped to only three 625 kHz bands 1314, 1316 and 1318 as indicated by reference numeral 1324. In this instance, one of the additional blocks 1310 and 1312 may be mapped to the additional 625 kHz band 1314. As a result, it is possible to successfully receive BCHs both when the UE performs initial cell search and when the UE performs cell search for neighboring cells.

Although not shown, if MBMS data is only transmitted in the upper 10 MHz band 1306, the BCH resource block 1312 mapped to the 625 kHz band 1314 within the 10 MHz band 1302 is eliminated and a BCH resource block 1310 is instead mapped to a 625 kHz band 1326 within the 10 MHz band 1306, so that the BCHs can be transmitted in three bands 1316, 1318 and 1326.

The operation and structure of a node B and a UE according to the third embodiment of the present invention are similar to those of the first embodiment of the present invention, so detailed description thereof will be omitted here.

According to the present invention, when a UE having a reception bandwidth smaller than the system bandwidth is in an active mode or is receiving broadcast service data in an idle mode in a cellular wireless communication system supporting a scalable bandwidth, the UE can successfully detect BCH information from neighboring cells and rapidly connect with a desired cell. Particularly, even when the resource mapping rules of the BCH are different according to the system bandwidth, the UE need not know the system bandwidth in advance in the process of cell search and can implement the BCH reception operation with a low BCH resource overhead.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a Broadcast CHannel (BCH) carrying system information in a cellular communication system, which supports a scalable bandwidth and uses multiple access technology, the method comprising:

mapping BCH modulation symbols including system information to a central band of a system band, the central band having a bandwidth equal to a transmission bandwidth of the BCH, wherein the BCH modulation symbols are constituted by sub-carrier symbols and are divided into first and second resource blocks, wherein each of the sub-carrier symbols refers to a modulation symbol mapped to one sub-carrier, and wherein the first resource block is mapped into a first half of the system band and the second resource block is mapped into a second half of the system band;

additionally mapping the first resource block of the BCH modulation symbols into the second half of the system band, and the second resource block of the BCH modulation symbols into the first half of the system band, when the system bandwidth is two times or larger than the maximum reception bandwidth of a User Equipment (UE); and transmitting a frequency domain signal, to which the first and second resource blocks are mapped, to the UEs located within the cell.

2. The method as claimed in claim 1, further comprising additionally mapping the BCH modulation symbols into transmission bands, which are located at both a left and right edge of the system band and have a bandwidth equal to the reception bandwidth, when the system bandwidth is equal to or larger than three times the amount of the reception bandwidth.

3. The method as claimed in claim 1, wherein the BCH modulation symbols are mapped while being prevented from being repeated in each of the transmission bands.

4. The method as claimed in claim 1, wherein the BCH modulation symbols are mapped to bands adjacent to the central band, respectively.

5. A method for receiving a Broadcast CHannel (BCH) carrying system information in a cellular communication system, which supports a scalable bandwidth and uses multiple access technology, the method comprising:

receiving BCH modulation symbols including system information through predetermined sub-carriers in a central band of a system band having a lower band and an upper band, when a User Equipment (UE) camps in the central band or a system bandwidth of a current cell in which the UE is located is smaller than two times an amount of a reception bandwidth of the UE, the central band having a bandwidth equal to the reception bandwidth of the UE, wherein the BCH modulation symbols are constituted by sub-carrier symbols and are divided into first and second resource blocks, wherein each of the sub-carrier symbols refers to a modulation symbol mapped to one sub-carrier, and wherein the first resource block is mapped into the lower band of the system band and the second resource block is mapped into the upper band of the system band;

receiving the BCH modulation symbols through predetermined sub-carriers in a camped band in which the UE camps, when the system bandwidth is equal to or larger than two times an amount of the reception bandwidth of the UE and the UE camps in the lower band or the upper band, wherein both the first resource block and the second resource block are mapped into the lower band or the upper band to which the UE camps; and obtaining the system information by decoding the BCH modulation symbols.

6. The method as claimed in claim 5, further comprising repeatedly receiving the BCH modulation symbols through the central band and combining the repeated BCH modulation symbols before decoding them.

7. The method as claimed in claim 5, wherein the BCH modulation symbols are mapped while being prevented from being repeated in the camped band.

8. The method as claimed in claim 5, wherein the BCH modulation symbols are received through sub-carriers corresponding to at least two times an amount of the transmission bandwidth of the BCH in the central band.

9. An apparatus for transmitting a Broadcast CHannel (BCH) carrying system information in a cellular communication system, which supports a scalable bandwidth and uses multiple access technology, the apparatus comprising:

a BCH sub-carrier symbol generator for generating BCH modulation symbols including system information, wherein the BCH modulation are constituted by sub-carrier symbols and are divided into first and second resource blocks, wherein each of the sub-carrier symbols refers to a modulation symbol mapped to one sub-carrier;

a sub-carrier symbol mapper for
mapping the BCH modulation symbols to a central band of a system band, the central band having a bandwidth equal to a transmission bandwidth of the BCH, wherein the first resource block is mapped into a first half of the system band and the second resource block is mapped into a second half of the system band, and additionally mapping the first resource block of the BCH modulation symbols into the second half of the system band, and the second resource block of the BCH modulation symbols into the first half of the system band, when the system bandwidth is two times or larger than an amount of the maximum reception bandwidth of a User Equipment (UE); and an Inverse Fast Fourier Transformer (IFFT) for converting a frequency domain signal, to which the first and second resource blocks are mapped, to a time domain signal and then transmitting the time domain signal to the UEs located within the cell.

10. The apparatus as claimed in claim 9, wherein the sub-carrier symbol mapper additionally maps the BCH modulation symbols into transmission bands, which are located at both a left and a right edge of the system band and have a bandwidth equal to the reception bandwidth, when the system bandwidth is equal to or larger than three times an amount of the reception bandwidth.

11. The apparatus as claimed in claim 9, wherein the sub-carrier symbol mapper maps the BCH modulation symbols while preventing the BCH modulation symbols from being repeated in each of the transmission bands.

12. The apparatus as claimed in claim 9, wherein the sub-carrier symbol mapper maps the BCH modulation symbols to bands adjacent to the central band, respectively.

13. An apparatus for receiving a Broadcast CHannel (BCH) carrying system information in a cellular communication system, which supports a scalable bandwidth and uses multiple access technology, the apparatus comprising:

a Radio Frequency (RF) unit for receiving a wireless signal of a band in which a UE camps;

a Fast Fourier Transformer (FFT) for converting the wireless signal to a frequency domain signal corresponding to multiple sub-carriers;

a sub-carrier symbol demapper for
detecting, from the frequency domain signal, BCH modulation symbols including system information through predetermined sub-carriers in a central band of a system band having a lower band and an upper band, when a User Equipment (UE) camps in the central band or a system bandwidth of a current cell in which the UE is located is smaller than two times an amount of a reception bandwidth of the UE, the central band having a bandwidth equal to the reception bandwidth of the UE, wherein the BCH modulation symbols are constituted by sub-carrier symbols and are divided into first and second resource blocks, wherein each of the sub-carrier symbols refers to a modulation symbol mapped to one sub-carrier, and wherein the first resource block is mapped into the lower band of the system band and the second resource block is mapped into the upper band of the system band, and detecting, from the frequency domain signal, the BCH modulation symbols through predetermined sub-carriers in a camped band in which the UE camps, when the system bandwidth is equal to or larger than two times the amount of the reception bandwidth of the UE and the UE camps in the lower band or the upper band, wherein both the first resource block and the second resource block are mapped into the lower band or the upper band to which the UE camps; and a decoder for obtaining the system information by decoding the BCH modulation symbols.

14. The apparatus as claimed in claim 13, wherein the decoder combines the BCH modulation symbols, which have been repeatedly received through the central band, before decoding the BCH modulation symbols.

15. The apparatus as claimed in claim 13, wherein the BCH modulation symbols are mapped while being prevented from being repeated in the camped band.

16. The apparatus as claimed in claim 13, wherein the sub-carrier symbol demapper receives the modulation symbols through sub-carriers corresponding to at least two times an amount of the transmission bandwidth of the BCH in the central band.

* * * * *